(12) United States Patent
Vayda

(10) Patent No.: US 9,499,878 B2
(45) Date of Patent: Nov. 22, 2016

(54) COMPOSITE BRIQUETTE FOR STEELMAKING OR IRONMAKING FURNACE CHARGE

(71) Applicant: Pierre Vayda, Burlington (CA)

(72) Inventor: Pierre Vayda, Burlington (CA)

( * ) Notice: Subject to any disclaimer, the term of this patent is extended or adjusted under 35 U.S.C. 154(b) by 53 days.

(21) Appl. No.: 14/289,960

(22) Filed: May 29, 2014

(65) Prior Publication Data

US 2015/0344989 A1  Dec. 3, 2015

(51) Int. Cl.

| | | |
|---|---|---|
| *C21B 13/00* | (2006.01) | |
| *C22B 1/245* | (2006.01) | |
| *C01F 5/24* | (2006.01) | |
| *C22B 9/10* | (2006.01) | |
| *C22B 1/242* | (2006.01) | |
| *C10L 5/04* | (2006.01) | |
| *C10L 5/10* | (2006.01) | |
| *C21B 5/04* | (2006.01) | |
| *C21C 5/52* | (2006.01) | |
| *C21C 5/54* | (2006.01) | |
| *C21C 7/00* | (2006.01) | |
| *C21C 7/06* | (2006.01) | |

(52) U.S. Cl.
CPC .................. *C22B 9/103* (2013.01); *C10L 5/04* (2013.01); *C10L 5/10* (2013.01); *C21B 5/04* (2013.01); *C21B 13/008* (2013.01); *C21B 13/0066* (2013.01); *C21C 5/527* (2013.01); *C21C 5/54* (2013.01); *C21C 7/0025* (2013.01); *C21C 7/06* (2013.01); *C22B 1/242* (2013.01); *C22B 1/245* (2013.01); *C21C 2007/0062* (2013.01); *Y02P 10/216* (2015.11)

(58) Field of Classification Search
CPC ........ C21B 13/008; C22B 1/245; C01F 5/24
See application file for complete search history.

(56) References Cited

U.S. PATENT DOCUMENTS

| | | | | |
|---|---|---|---|---|
| 3,804,648 | A * | 4/1974 | Birchall ................. | C04B 35/52 106/691 |
| 3,923,526 | A * | 12/1975 | Takashima .............. | B22D 7/10 106/38.22 |
| 4,042,410 | A * | 8/1977 | Ito ............................. | C21B 3/06 65/20 |
| 2007/0051200 | A1* | 3/2007 | Vayda ................... | C21C 7/0025 75/327 |
| 2007/0266824 | A1* | 11/2007 | Stein ........................ | C21C 5/54 75/325 |

FOREIGN PATENT DOCUMENTS

AU           479174       *  4/1974  ............... B01J 6/00

* cited by examiner

*Primary Examiner* — George Wyszomierski
*Assistant Examiner* — Tima M McGuthry Banks
(74) *Attorney, Agent, or Firm* — Renner Kenner Greive Bobak Taylor & Weber

(57) ABSTRACT

A briquette for addition to the charge in a steelmaking or ironmaking furnace comprises a quantity of carbon fines, a material in powdered form, the material selected from the group consisting of iron powder and iron oxide, the material densifying the briquette and suppressing the slippery nature of the carbon fines, a quantity of magnesium carbonate, and a binder.

15 Claims, No Drawings

COMPOSITE BRIQUETTE FOR STEELMAKING OR IRONMAKING FURNACE CHARGE

FIELD OF THE INVENTION

The present invention relates generally to ferrous metallurgy and in particular, to a composite briquette for a steelmaking or ironmaking furnace charge.

BACKGROUND OF THE INVENTION

In the field of steelmaking, an electric furnace charge is typically made from scrap metal, carbon and fluxes such as lime and/or dolime, all in pieces having a minimum size of 0.5 inch.

It is known to add specific materials to a furnace charge in the form of briquettes. However, carbon, which is an essential part of the mixture of materials, is quite slippery in its powdered or comminuted form. Consequently, carbon is typically employed in a non-pulverized state, for example as coke. It would be of advantage to be able to utilize carbon "fines", for example those recovered from a dust collector, and to recycle such fines in their powdered or dust state. A further problem relates to the density of carbon, which is quite low compared generally to the metals. For example, when carbon is added to the furnace via a charge bucket, it will tend to float on top of the liquid metal, thus decreasing the yield of carbon in solution in the steel.

Further, it would also be of advantage to improve the quality of the slag through the addition of the briquette.

Improvements are generally desired. It is therefore an object at least to provide a novel composite briquette for steelmaking or ironmaking furnace charge.

SUMMARY OF THE INVENTION

In one aspect, there is provided a composite briquette for addition to the charge in a steelmaking or ironmaking furnace, the briquette comprising: a quantity of carbon fines; a material in powdered form, the material selected from the group consisting of iron powder and iron oxide, the material densifying the briquette and suppressing the slippery nature of the carbon fines; a quantity of magnesium carbonate; and a binder.

The briquette may comprise from 1 to 10% by weight of the binder. The briquette may further comprise one or more selected from the group consisting of: limestone, lime, dolomite, and dolime. The binder may comprise molasses and lime. 50% of the total briquette weight may be carbon fines, 25% of the total briquette weight may be iron powder, and the remainder of the total briquette weight, apart from the binder, may be magnesium carbonate and one or more selected from the group consisting of: limestone, lime, dolomite, and dolime. The furnace may be an electric arc furnace, a basic oxygen furnace, or a blast furnace.

In another aspect there is provided a method of improving the slag-covered charge in a steelmaking or ironmaking furnace, the method comprising: making a mixture of: a quantity of carbon fines, a material in powdered form selected from the group consisting of iron powder and iron oxide, the material densifying the briquette and suppressing the slippery nature of the carbon fines, a quantity of magnesium carbonate, and a binder; compressing a portion of said mixture in a suitable mold to make a briquette; and introducing said briquette to the charge below the slag in the steelmaking or ironmaking furnace so that said material in powdered form contained in the briquette will cause the same to sink into the charge.

The mixture may comprise from 1 to 10% by weight of the binder. The mixture may further comprise one or more selected from the group consisting of: limestone, lime, dolomite, and dolime. The binder may comprise molasses and lime. 50% of the total briquette weight may be carbon fines, 25% of the total briquette weight may be iron powder, and the remainder of the total briquette weight, apart from the binder, may be magnesium carbonate and one or more selected from the group consisting of: limestone, lime, dolomite, and dolime. The material may be iron powder, whereby upon introducing the briquette to the charge, $CO_2$ is generated such that the $CO_2$ foams the slag from underneath. The material may be iron oxide, whereby upon introducing the briquette to the charge, caloric heat is added thereto while iron and $CO_2$ are generated, such that the $CO_2$ foams the slag from underneath. The furnace may be an electric arc furnace, a basic oxygen furnace, or a blast furnace.

In another aspect, there is provided a composite briquette for addition to the charge in a steelmaking or ironmaking furnace, the briquette comprising: at least 70% magnesium carbonate; and a binder.

The briquette may comprise from 1 to 20% by weight of the binder. The binder may comprise molasses and lime. The briquette, after calcining, may further comprise one or more substances selected from the group consisting of: CaO, $Al_2O_3$, $SiO_2$, and $Fe_2O_3$. The briquette may comprise about 90% by weight magnesium carbonate and about 10% by weight of the binder. The furnace may be an electric arc furnace, a basic oxygen furnace, or a blast furnace.

In another aspect, there is provided a method of improving the slag-covered charge in a steelmaking or ironmaking furnace, the method comprising: introducing a quantity of magnesium carbonate to the charge below the slag in the steelmaking or ironmaking furnace, whereby upon introducing the quantity of magnesium carbonate to the charge, $CO_2$ is generated, such that the $CO_2$ foams the slag from underneath.

The quantity of magnesium carbonate may be a powderized mixture. The powderized mixture, after calcining, may further comprise one or more substances selected from the group consisting of: CaO, $Al_2O_3$, $SiO_2$, and $Fe_2O_3$.

The quantity of magnesium carbonate may be combined with a binder, and the method may further comprise: prior to said introducing, compressing said quantity of magnesium carbonate and said binder in a suitable mold to make a briquette, wherein said introducing comprises introducing said briquette to the charge below the slag in the steelmaking or ironmaking furnace. The briquette may comprise about 90% by weight magnesium carbonate and about 10% by weight of the binder. The briquette, after calcining, may further comprise one or more substances selected from the group consisting of: CaO, $Al_2O_3$, $SiO_2$, and $Fe_2O_3$. The binder may comprise molasses and lime.

The furnace may be an electric arc furnace, a basic oxygen furnace, or a blast furnace.

DETAILED DESCRIPTION OF THE EMBODIMENTS

The following is directed to a composite briquette for addition to the charge in a steelmaking or ironmaking furnace, and which comprises magnesium carbonate ($MgCO_3$).

Magnesium carbonate is known to thermally decompose at a lower temperature than dolomite ($CaMg(CO_3)_2$) and limestone ($CaCO_3$). Specifically, $MgCO_3$ thermally decomposes into magnesium oxide (MgO) and carbon dioxide ($CO_2$) at about 402° C., while $CaMg(CO_3)_2$ and $CaCO_3$ each thermally decompose into their constituent oxides at about 730° C. and about 825° C., respectively. As a result, when added to the charge in a steelmaking or ironmaking furnace, magnesium carbonate thermally decomposes more quickly, and more readily, than limestone or dolomite.

Table 1 shows a non-limiting example of a mixture from which a suitable briquette can be fashioned:

TABLE 1

| Carbon | C | 50% |
|---|---|---|
| Powdered iron | Fe | 25% |
| Magnesium carbonate | $MgCO_3$ | 25% |
| Total | | 100% |

In the table above, deviations from the indicated percentages may occur, up to about 5% to either side of the indicated level. The ingredients may be combined with a suitable binder, such as for example industrial molasses and powdered lime, and the binder may make up 1 to 20%, or more, of the total weight of the briquette.

The example illustrated in Table 1 specifies powdered iron. However, this teaching is not intended to be restrictive, as it is possible to use one or more of iron, iron oxide, chromium, chromium oxide, nickel, and nickel oxide to achieve the same effect. If iron oxide is used, the reaction products will be iron and $CO_2$ gas, as well as caloric heat that results from burning of the iron oxide. The iron will revert to the bath, thus increasing its yield.

The magnesium carbonate could be combined with limestone and/or dolomite, each of which will produce $CO_2$ gas with the same effect as above. Dolime, lime, and/or magnesium oxide may also be included.

The ironmaking furnace may be, for example, a blast furnace. The steelmaking furnace may be, for example, an electric arc furnace, a basic oxygen furnace, and the like.

In use, the briquette is added to the charge in a steelmaking or ironmaking furnace, in such a manner that it is immersed within the charge. The briquette dissolves and reacts with the contents of the charge. The powdered iron reverts to the bath, thus increasing its yield. The magnesium carbonate thermally decomposes into magnesium oxide (MgO) and carbon dioxide ($CO_2$). The magnesium oxide (MgO) produced is absorbed by the slag. The $CO_2$ produced has the effect of foaming the slag from underneath, as the location where the $CO_2$ is generated is buried within the charge.

As will be appreciated, the low decomposition temperature of magnesium carbonate advantageously allows the slag thickness to be increased more rapidly than, and with less energy consumption than, other substances such as limestone, dolomite, and the like. As will be understood, the rapid formation of a thick slag decreases the amount of oxidation of iron in the bath, which improves of the yield of the reaction. Additionally, if the steelmaking furnace is an electric arc furnace, the increased thickness of the slag advantageously causes the arc to be more localized within the bath and under the slag, which improves efficiency of the electric arc furnace and thereby allows melt times to be shortened. These performance characteristics help mitigate the environmental impact of steelmaking and ironmaking operations, and conserve resources.

As will be appreciated, the accompanying production of $CO_2$ gas that occurs upon decomposition of magnesium carbonate causes bubbling under the surface of the bath, which advantageously causes mixing and improves the quality of the slag, and namely the foaminess, consistency and stability of the slag.

As will be appreciated, the addition of MgO to the slag advantageously results in formation of a protective layer of MgO on the walls of the furnace. As will be understood, as the melt is being drained from the furnace, the slag contacts the wall surfaces of the furnace and deposits a layer of MgO thereon. As a result, a new protective refractory coating is automatically deposited on the walls of the furnace with each use, which eliminates the need for separate application of a protective wall coating that would otherwise form part of routine furnace maintenance.

The briquette is not limited to the composition described above, and in other embodiments, the briquette may alternatively have other compositions. For example, in another embodiment, magnesium carbonate may be added to the charge of a steelmaking or ironmaking furnace for improving the quality of the slag.

For example, powdered magnesium carbonate ore may be combined with a suitable binder, such as for example industrial molasses and powdered lime, and compressed in a suitable mold to make a briquette. The binder may make up 1 to 20%, or more, of the total weight of the briquette.

The magnesium carbonate could be combined with one or more other substances. Such substances may comprise, for example, limestone and/or dolomite, each of which will produce $CO_2$ gas upon decomposition, and/or any of dolime, lime, and magnesium oxide. Still other substances may be combined with the magnesium carbonate.

The ironmaking furnace may be, for example, a blast furnace. The steelmaking furnace may be, for example, an electric arc furnace, a basic oxygen furnace, and the like.

In use, the briquette is added to the charge in a steelmaking or ironmaking furnace, in such a manner that it is immersed within the charge. The briquette dissolves and reacts with the contents of the charge. The magnesium carbonate thermally decomposes into magnesium oxide (MgO) and carbon dioxide ($CO_2$). The magnesium oxide (MgO) produced is absorbed by the slag. The $CO_2$ produced has the effect of foaming the slag from underneath, as the location where the $CO_2$ is generated is buried within the charge.

In another embodiment, magnesium carbonate ore, in absence of a binder, may be added in powdered or granular form to the charge of a steelmaking or ironmaking furnace for improving the quality of the slag.

The following examples illustrate various applications of the above-described embodiments.

EXAMPLE 1

In this example, a briquette having the composition shown in Table 2 was made:

TABLE 2

| Carbon | 43.7% |
|---|---|
| Fe | 22.5% |
| CaO | 12.2% |
| MgO | 6.6% |

TABLE 2-continued

| | |
|---|---|
| S | 2.9% |
| L.O.I. | 12.1% |

The dolime could be replaced with magnesium carbonate, which will produce $CO_2$ gas, with the foaming effect described above.

The L.O.I. is mainly attributed to the decomposition of the dolomite and the binder used. The layer of CO and $CO_2$ produced will protect the bath from oxidation and enhance the carbon yield.

The manufacturing process by which the briquette is formed has the effect of densification, with the following typical values: loose carbon prior to compression has a density of approximately 0.63 to 0.65 $g/cm^3$. If a briquette is manufactured from the loose carbon only, the density can be raised into the range of 1.6 to 1.75 grams/cc. However, utilizing the formulation given at the beginning of this example, and compressing the formulation, will yield a density in the range of 2.4 to 2.6 grams/cc.

The densification due to compression has the effect of increasing the efficiency of the carbon addition, since the carbon is allowed to penetrate the bath, rather than simply floating on top of the bath.

EXAMPLE 2

In this example, a briquette having the post-calcination composition shown in Table 3 was made:

TABLE 3

| | |
|---|---|
| MgO | 92.19% |
| CaO | 2.46% |
| $Al_2O_3$ | 0.85% |
| $SiO_2$ | 2.58% |
| $TiO_2$ | 0.14% |
| $Fe_2O_3$ | 0.71% |
| $Cr_2O_3$ | 0.02% |
| MnO | 0.05% |
| S | <0.001% |
| Moisture | 1.0% |
| Total | 100% |

The briquette was formed by providing a mixture of powdered magnesium carbonate ore and a binder, combined in a weight ratio of 90:10, and compressing the mixture in a suitable mold. The binder was a mixture of industrial molasses and powdered lime, combined in a weight ratio of 3:2.

The briquette had a generally square shape and a size of 40 mm per side, with a density of 2.18 $g/cm^3$ and a white colour. The briquette had a L.O.I. value of 35.0%, which is mainly attributed to the decomposition of the magnesium carbonate and the binder. Notably, the L.O.I. value of the briquette is lower than the L.O.I. value of the powderized mixture of Example 3.

The briquette was used during reactions in a 125 tonne electric arc furnace. A summary of the performance of the briquette ("Briquette A") during the reactions is shown in Table 4. For comparison, a summary of the performance of a standard conventional additive, namely crushed brick ("standard practice"), during the reactions is also shown:

TABLE 4

| | Standard Practice | Briquette A | difference |
|---|---|---|---|
| Number of Heats | 44 | 11 | |
| Quantity added (lbs) | 3500 | 3500 | |
| Actual MgO added (lbs) | 3220 | 2100 | −34.78% |
| Average MgO in solution (%) | 8.79 ± 1.75 | 9.20 ± 1.88 | +4.66% |
| Briquette A with $1^{st}$ charge (%) | | 10.69 ± 1.80 | |
| Briquette A with $2^{nd}$ charge (%) | | 7.95 ± 0.62 | |

As may be seen, the use of Briquette A results in a reduction of the actual MgO added by about 35%, while advantageously increasing the average MgO in the slag by about 4.5%. The amount of MgO in the slag is about 34% higher when the Briquette A was added with the first charge (i.e. when little or no slag layer previously existed) than when the Briquette A was added with the second charge.

The decomposition of magnesium carbonate within Briquette A produces fine, active MgO particles, which are absorbed by the slag. It was observed that when Briquette A was added and the briquettes penetrated the slag so as to be buried in the charge, tiny bubbles of $CO_2$ were seen to form.

The average composition of the slag after the reactions, by weight percent, is shown in Table 5:

TABLE 5

| | Standard Practice | Briquette A | difference |
|---|---|---|---|
| CaO | 36.07 ± 3.72 | 36.41 ± 3.04 | +0.93% |
| $Al_2O_3$ | 6.99 ± 1.98 | 7.68 ± 0.99 | +9.87% |
| $SiO_2$ | 11.83 ± 3.75 | 13.23 ± 1.44 | +11.83% |
| $Fe_2O_3$ | 27.71 ± 7.32 | 24.59 ± 5.53 | −11.26% |
| $Mn_2O_3$ | 5.46 ± 1.03 | 5.31 ± 0.37 | −2.82% |

As may be seen, the use of Briquette A results in a reduction of the iron content of the slag by more than 11%, as compared to standard practice. This may be attributed to the ability of the magnesium carbonate to rapidly decompose and contribute to or form the slag, which allows a protective barrier to more quickly form on the bath surface. As a result, less of the iron in the bath is oxidized during the reaction, which advantageously increases the yield of the reaction.

During the test, 22 heats were carried out using crushed brick, followed by 11 heats carried out using Briquette A, followed by 22 heats carried out using crushed brick. The operational performance of the 125 tonne electric arc furnace before, during, and after the addition of Briquette A is shown in Table 6:

TABLE 6

| | Standard Practice (before test) | Standard Practice (after test) | Standard Practice (avg) | Briquette A |
|---|---|---|---|---|
| Power usage (KWh/T) | 427.0 ± 24.1 | 428.0 ± 14.4 | 427.5 | 420.0 ± 9.9 |

As may be seen, the amount of power required for the reaction is lower when Briquette A is used, as compared to standard practice.

EXAMPLE 3

Magnesium carbonate may alternatively be added to the charge in powderized form. A powderized mixture having the post-calcination composition shown in Table 7 was used:

TABLE 7

| | |
|---|---|
| MgO | 97.0% |
| CaO | 2.0% |
| $Al_2O_3$ | 0.2% |
| $SiO_2$ | 0.3% |
| $Fe_2O_3$ | 0.5% |
| Total | 100% |

The powderized mixture had a density of 2.28 g/cm³ and a white colour.

The powderized mixture was used during a reaction in a 125 tonne electric arc furnace.

The powderized mixture had a L.O.I. value of 51.1%. Notably, the L.O.I. value of the powderized mixture is greater than the L.O.I. value of the briquette of Example 2.

Although embodiments have been described above with reference to the accompanying drawings, those of skill in the art will appreciate that variations and modifications may be made without departing from the scope thereof as defined by the appended claims.

What is claimed is:

1. A composite briquette for addition to the charge in a steelmaking furnace, the briquette comprising:
    a quantity of carbon fines;
    a quantity of iron powder, the iron powder densifying the briquette and suppressing the slippery nature of the carbon fines;
    a quantity of magnesium carbonate;
    a quantity of limestone; and
    a binder.

2. The briquette of claim 1, wherein the briquette comprises from 1 to 10% by weight of the binder.

3. The briquette of claim 1, wherein the binder comprises molasses and lime.

4. The briquette of claim 1, wherein 50% of the total briquette weight is carbon fines, 25% of the total briquette weight is iron powder, and the remainder of the total briquette weight, apart from the binder, is magnesium carbonate and limestone.

5. The briquette of claim 1, wherein the steelmaking furnace is an electric arc furnace or a basic oxygen furnace.

6. Use of the briquette of claim 1 as addition to the charge in the steelmaking furnace, the furnace being an electric arc furnace or a basic oxygen furnace.

7. A method of improving the slag-covered charge in a steelmaking furnace, the method comprising:
    making a mixture of: a quantity of carbon fines, a quantity of iron powder; a quantity of magnesium carbonate, a quantity of limestone, and a binder;
    compressing a portion of said mixture in a suitable mold to make a briquette, the iron powder densifying the briquette and suppressing the slippery nature of the carbon fines; and
    introducing said briquette to the charge below the slag in the steelmaking furnace so that said quantity of iron powder contained in the briquette will cause the same to sink into the charge.

8. The method of claim 7, wherein the mixture further comprises one or more selected from the group consisting of: lime, dolomite, and dolime.

9. The method of claim 7, wherein 50% of the total briquette weight is carbon fines, 25% of the total briquette weight is iron powder, and the remainder of the total briquette weight, apart from the binder, is magnesium carbonate and one or more selected from the group consisting of: limestone, lime, dolomite, and dolime.

10. The method of claim 7, whereby upon introducing the briquette to the charge, $CO_2$ is generated such that the $CO_2$ foams the slag from underneath.

11. The method of claim 7, wherein the furnace is selected from an electric arc furnace and a basic oxygen furnace.

12. A composite briquette for addition to the charge in a steelmaking furnace, the briquette comprising:
    at least 85% magnesium carbonate; and
    the remainder of the briquette weight being a binder, the binder comprising molasses and lime.

13. The briquette of claim 12, wherein the briquette comprises about 90% by weight magnesium carbonate and about 10% by weight of the binder.

14. The briquette of claim 12, wherein the furnace is an electric arc furnace or a basic oxygen furnace.

15. Use of the briquette of claim 12 as addition to the charge in the steelmaking furnace, the furnace being an electric arc furnace or a basic oxygen furnace.

* * * * *